M. H. PALMER.
MIDDLINGS SEPARATOR.

No. 188,938. Patented March 27, 1877.

Witnesses.
L. Van Riswick
Geo. T. Brereton

Inventor:
Matthew H. Palmer
By Wm H. Brereton
Atty.

UNITED STATES PATENT OFFICE.

MATTHEW H. PALMER, OF MANTORVILLE, MINNESOTA.

IMPROVEMENT IN MIDDLINGS-SEPARATORS.

Specification forming part of Letters Patent No. 188,938, dated March 27, 1877; application filed November 27, 1876.

*To all whom it may concern:*

Be it known that I, MATTHEW H. PALMER, of Mantorville, in the county of Dodge and State of Minnesota, have invented certain new and useful Improvements in Middlings Machines or Purifiers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to middlings purifiers or separators; and consists of a device placed in the main air-chamber of the machine, interposed between the feed-board and first long screen or bolt, whereby the middlings are cooled and purified before passing to the regular bolting operation, all as and for the purposes hereinafter more fully set forth and shown.

Figure 1:
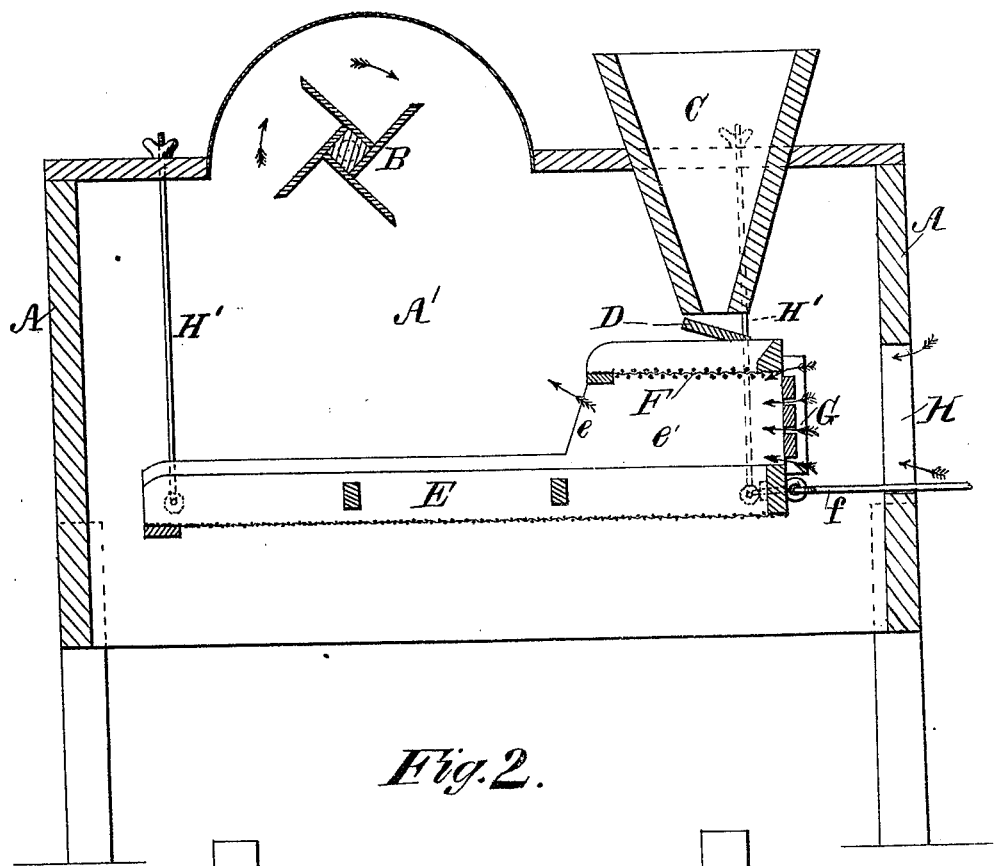
Figure 2:
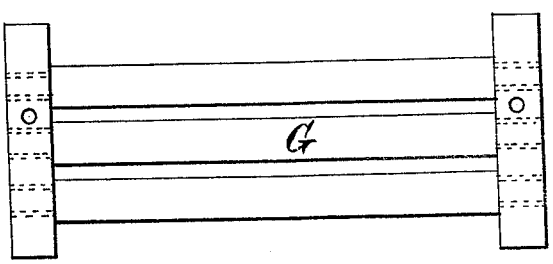

In the drawings, Figure 1 is a vertical longitudinal section of a portion of a middlings-machine with my feeder and purifier attached; Fig. 2, an end view of same.

A represents an ordinary middlings-machine, with fan B, hopper C, feed-board D, and coarse distributing-sieve E, arranged and operating as usual, or in any preferred manner. At the end of long sieve or bolt E in main air-chamber A', between bolt E and just below feed-board D, is arranged a short sieve, F, of wire-cloth, or of cloth of a coarser number than bolt E. This sieve F is secured to bolt E by side pieces e, and operated or vibrated together with it by rods H' and pitman f, in any suitable way. Secured to the end of the sieve F and bolt E, crossing the head and covering the opening between the short and long sieves, are bars or lattice-work G, which distribute the air-current in thin sheets. These slats or bars G may be made either stationary or adjustable, as desired or found necessary.

As will be seen, the entire arrangement of devices constituting my invention, consisting of short coarse sieve F and lattice-work G, is secured on the frame of long sieve or bolt E, between it and the feed-board D in main air-chamber A' of the machine, and operated upon directly by main fan B.

The operation of the parts is as follows: As the middlings are fed from hopper C onto feed-board D, they are thrown off by its motions, and caught on short sieve F, where they are spread out, and sifted or screened and distributed through it. From this sieve the middlings fall, in thin columns or a finely-divided state, directly onto long sieve or bolt E. In falling from short sieve F to bolt E the middlings are operated upon by the currents of air entering in thin sheets through lattice-work G, and passing, in direction of fan, directly through the falling middlings. Thus all brown or fuzzy matter is taken from the middlings, and the middlings are delivered to the bolting-cloth in a clean, cool, and purified condition.

The lattice-work or grating, by restricting the air-currents into the form of thin sheets, gives it more force, and insures more perfectly the carrying off of light matters.

The advantages and usefulness of this improvement are manifest; for by it the middlings, in a single machine and operation, are freed from numerous impurities before undergoing the regular bolting operation. It is also kept cool and dry, which greatly facilitates the future operations which they undergo before being finally graded into flour.

Having thus described my invention, what I claim as new, and desire to secure by Letters Patent, is—

The combination, with the suction-fan B, of the reciprocating frame carrying the coarse distributing-sieve F and bolt E, and provided with slats G, secured to the end of said frame in the interval between the sieve and bolt, the whole arranged and operating within the same air-chamber, substantially as and for the purposes described.

In testimony that I claim the foregoing as my own I affix my signature in presence of two witnesses.

MATTHEW H. PALMER.

Witnesses:
 JOHN H. CRAWFORD,
 CHAS. G. MCMANUS.